United States Patent
Salvati et al.

[11] 3,793,564
[45] Feb. 19, 1974

[54] METAL ENCLOSED SWITCHGEAR WITH S-SHAPED VERTICALLY DISPOSED CONDUCTORS

[75] Inventors: John G. Salvati, Beaver Falls, Pa.; Earl O. Krance, Sarasota, Fla.

[73] Assignee: Westinghouse Electric Corporation, Pittsburgh, Pa.

[22] Filed: Feb. 14, 1973

[21] Appl. No.: 332,459

[52] U.S. Cl. ............. 317/120, 339/22 B, 174/68 B, 174/129 B
[51] Int. Cl. .............................. H02b 1/20
[58] Field of Search ........... 317/119, 120; 339/22 B; 174/16 B, 68 B, 70 B, 71 B, 72 B, 129 B, 133 B

[56] References Cited
UNITED STATES PATENTS

| | | |
|---|---|---|
| 3,349,291 | 10/1967 | Olashaw .............................. 317/120 |
| 3,308,348 | 3/1967 | Olashaw .............................. 317/119 |
| 2,938,942 | 5/1960 | Stanback .......................... 174/133 B |

*Primary Examiner*—Robert K. Schaefer
*Assistant Examiner*—Gerald P. Tolin
*Attorney, Agent, or Firm*—H. G. Massung

[57] ABSTRACT

Each section of a three-phase metal-enclosed switchgear unit is provided with main through horizontal bus and generally S-shaped vertical risers or section bus. The S-shaped vertically extending risers are connected to the horizontal main through bus and feed circuit breakers or other branch bus circuit controlling devices, mounted in the switchgear unit. The S-shaped vertical section bus provides a flat surface facing the front of the switchgear unit to which circuit controlling devices can easily be mounted, and also provides a flat surface facing the rear of the switchboard section for easy connection to the main through horizontal bus.

6 Claims, 5 Drawing Figures

PATENTED FEB 19 1974 3,793,564

METAL ENCLOSED SWITCHGEAR WITH S-SHAPED VERTICALLY DISPOSED CONDUCTORS

BACKGROUND OF THE INVENTION

This invention relates generally to switchgear and more particularly to metal-enclosed switchgear of a type suitable for relatively low voltage power distribution service. More specifically, this invention relates to the vertical risers or section bus which forms a part of the switchgear unit.

A metal-enclosed switchgear installation usually includes one or more units with each unit consisting of a plurality of sections or cells. The sections are assembled side-by-side to provide a unit or assembly capable of housing a desired number of circuit breakers or other circuit controlling devices. The maximum number of sections assembled in a unit at the factory is usually governed by the handling and shipping facilities available. Associated main through horizontal bus conductors and the vertical riser conductors are electrically connected at one or more points. For economic reasons, it is desirable that the amount of through horizontal bus, vertical section bus, branch bus, load side extensions and interconnecting conductors be kept to a minimum. This can best be achieved by having the horizontal through bus for each phase of a three-phase system spaced apart in a vertical plane behind the vertical section bus. It is also desirable to have an easy and economic means of connecting the horizontal through bus to the vertical section bus.

Each switchgear section comprises a structural framework and a formed sheet metal enclosure. Each switch-gear unit generally has a breaker compartment at the front, a cable compartment at the rear and a bus or conductor compartment between the cable compartment and the breaker compartment. The breaker compartment can be divided into a plurality of individual enclosures for housing circuit breakers or other circuit controlling devices. The bus compartment contains main through bus bars and vertical riser conductors or vertical section bus to which the branch bus and individual circuit breakers are connected. Load side connectors extend from the circuit breaker, past the vertical section bus, through the bus compartment and terminate in the cable compartment at the rear of the switchgear cell. Here, cables feeding branch circuit loads can easily be connected to the load side conductors. In order to keep the length of the load side conductors to a minimum it is desirable that the depth of the bus compartment be kept as small as is practical. The cables which supply various loads or feeder circuits with electric power, are connected to the load side conductors when the switchgear unit is installed in service.

With increased system capacity and higher available short circuit current it is important that electrical conductors are constructed and positioned to withstand high magnetic forces. Under short circuit conditions where high fault currents produce electromagnetic forces of a large magnitude between conductors it is especially important that the through bus and section bus be so constructed as to withstand these forces.

SUMMARY OF THE INVENTION

In accordance with the invention, a metal-enclosed switchgear unit is provided with main through horizontal bus and S-shaped vertical section bus conductors. The main through bus comprises flat bus bars having their longitudinal axis extending in a horizontal direction, with each phase being separated by a vertical space. The phases of the horizontal through bus are positioned in a spaced apart relationship with the bus bars width axes, of all phases, lying in a generally vertical plane. That is, the bus bars of each phase are positioned in an edge-to-edge spaced apart relationship with the bus bars of the other phase. The vertical space between the edges of the bus conductors is large enough, approximately 1½ to 2 times the bus bar width, to greatly reduce short circuit magnetic forces.

The vertical section bus conductors are disposed in front of the main through horizontal bus a sufficient distance to maintain the required through air clearance. The phases of the vertical bus conductors are separated also by sufficient distance to maintain their required phase-to-phase through air clearance. The S-shaped vertical section bus is disposed in the switchgear unit with a front flat surface facing the front of the switchgear section and a rear flat surface, in a generally front-to-rear alignment with the front flat surface, facing the rear of the switchgear section. Connecting the S-shaped vertical section bus to the horizontal main bus is relatively easy since the rear flat facing surface is provided on the S-shaped vertical bus. In the preferred embodiment, the horizontal through bus is electrically connected to the vertical section bus by bolting a rectangular tubular connector therebetween. The longitudinal axis of the rectangular tubular connector is positioned in generally vertical alignment. The depth of this rectangular tubular connector is sufficient to provide the required through air clearance. The length of this rectangular tubular connector is approximately equal to the width of the bus bars used for the main through bus to which the vertical bus is connected. The rectangular tubular connector provides both the necessary contact area for connecting to the main bus and the required through air clearance between the main through bus and the vertical section bus of different phases.

The S-shaped vertical section bus provides a flat surface facing the front of the switchboard section to which circuit breakers and other circuit interrupting or controlling devices can easily be attached. In mounting the individual circuit interrupting devices to the S-shaped vertical section bus, the line side connectors coming off the circuit interrupter are bolted to the vertical section bus. When making bolted joints, some minimum contact area under pressure must be maintained in order to minimize heat generation and hot spots. Therefore, the flat surface to which the circuit interrupters are attached have a flat surface, of minimum width determined by possible heat generation, facing the front of the switchboard. This flat surface has a maximum width restriction due to the space confines of the metal-enclosed switchgear. Depth of the vertical section connection to the main through bus must be kept minimal, because, as the front surface of the vertical bus becomes further spaced from the main through bus all the breaker load side connectors which extend past the vertical section bus into the cable compartment of the switchboard increase in length.

The cross-sectional area of the S-shaped vertical section bus has a relatively high section modulus which provides good strength and prevents deformation under high short circuit current conditions. The S-shaped cross-section also provides for a minimum of reaction between phases under short circuit conditions. The front and back flat surfaces provide easy mounting points for short circuit bracing. Short circuit bracing can easily be provided at both the front and the rear of the S-shaped vertical section.

The S-shaped vertical section bus also lends itself to the addition of flat bus bars along the middle flat surface for increasing the ampacity of the vertical bus. By adding additional flat bars the current rating of the vertical section bus can be increased without increasing the outside dimensions of the vertical bus section. The S-shaped vertical bus also provides a large surface area for good heat dissipation. This means that for a particular cross-section the ampacity of the S-shaped vertical bus is increased.

BRIEF DESCRIPTION OF THE DRAWINGS

For a better understanding of the invention, reference may be had to the preferred embodiment exemplary of the invention shown in the accompanying drawings, in which.

DESCRIPTION OF THE PREFERRED EMBODIMENT

Figure 1:
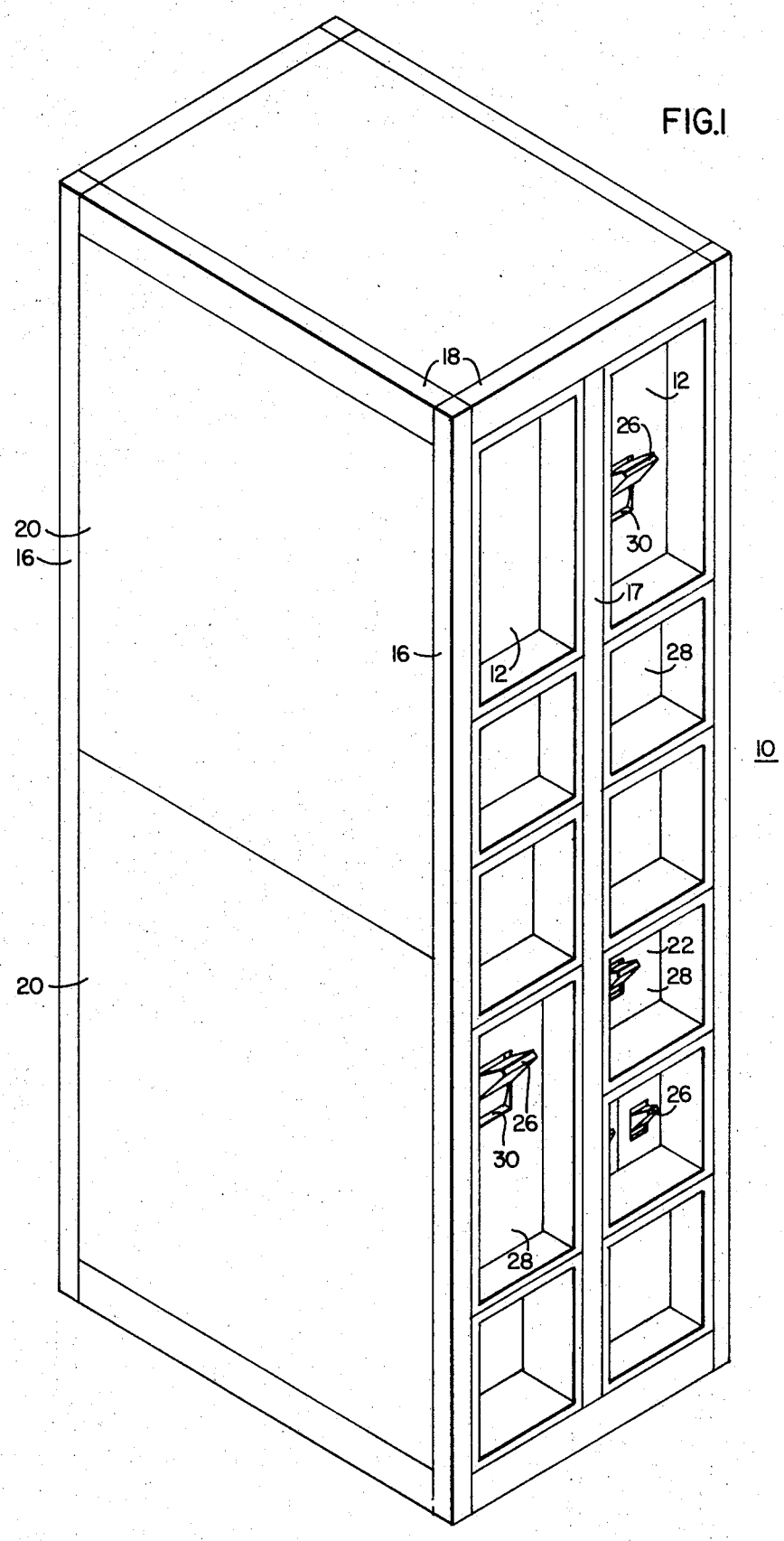
FIG. 1 is a perspective view of a double section switchgear unit.
Figure 4:
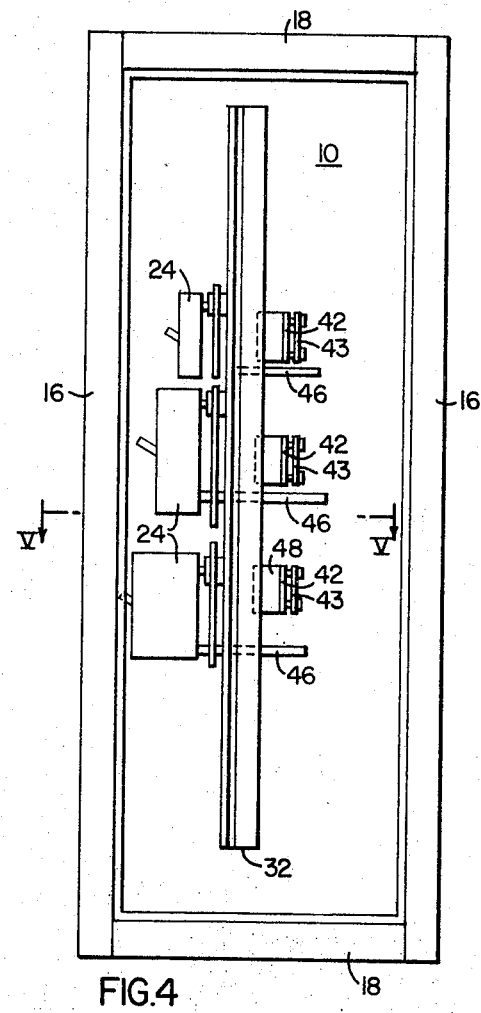
FIG. 4 is a side view of a switchgear section showing some molded case circuit breakers mounted to the S-shaped vertical risers.

Referring now to the drawings and to FIG. 1 in particular there is shown a switchgear unit 10 comprising two generally rectangular upstanding sections or cells 12 disposed in side-by-side relationship. Additional cells may be added as desired. Generally, each switchgear unit comprises structural members 16, 17 and 18 to which formed cover sheets 20 and front covers 28 are added. The front portion of each switchgear section 12 is divided into smaller enclosures 22 for various circuit breakers 24 and other circuit controlling apparatus. These enclosures 22 are disposed one below the other for the height of the switchgear section 12. As shown in FIGS. 1 and 4, when the molded case circuit breakers 24 are mounted in the switchgear section 12 the front of the circuit breakers 24 is set back from the front of the switchgear section 12. The operating handles 26 of the molded case circuit breakers 24 are also recessed from the front of the switchgear unit 10. Covers 28, which attach to the vertical structural members 16 and 17, form a part of the front face of the switchgear unit 10. Circuit breaker operating handles 26 project through openings 30 formed in the front covers 28. The breaker handles 26 are thus set back from the front of switchgear unit 10 in a shallow well or cover 28 and are partially protected from material or personnel moving across the front of the switchboard unit 10.

Figure 2:
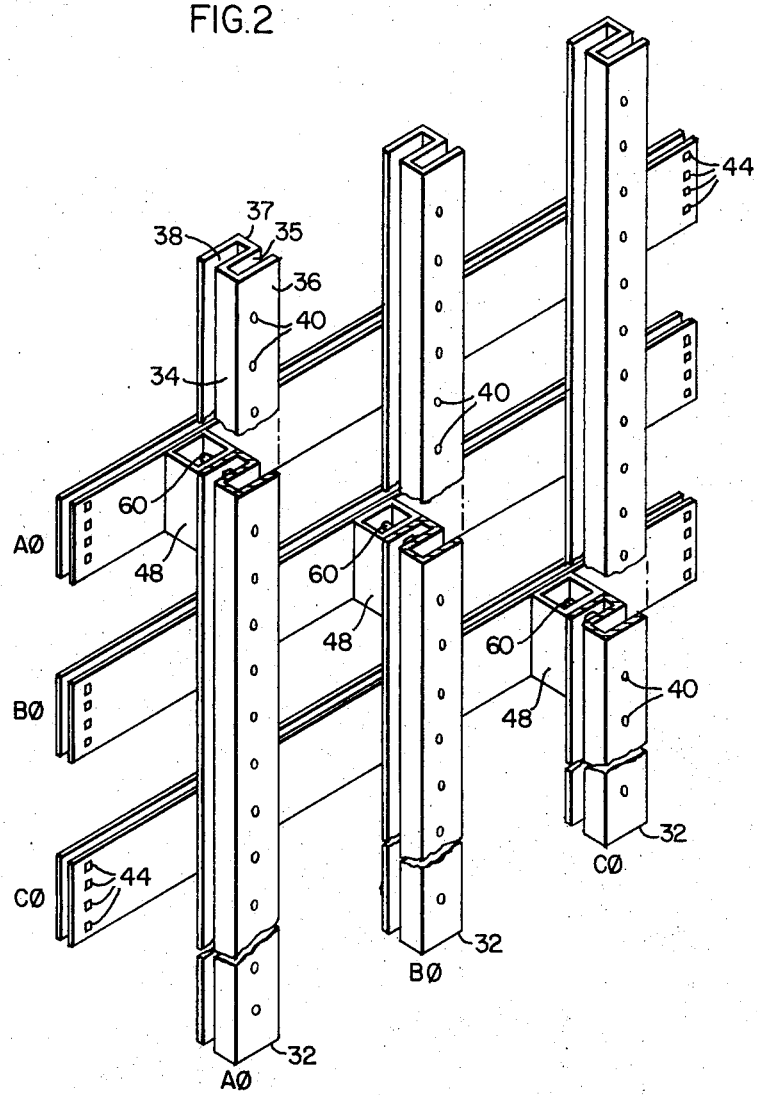
FIG. 2 is a perspective view of the horizontal through bus and the S-shaped vertical bus for one section of a switchgear unit.
Figure 5:
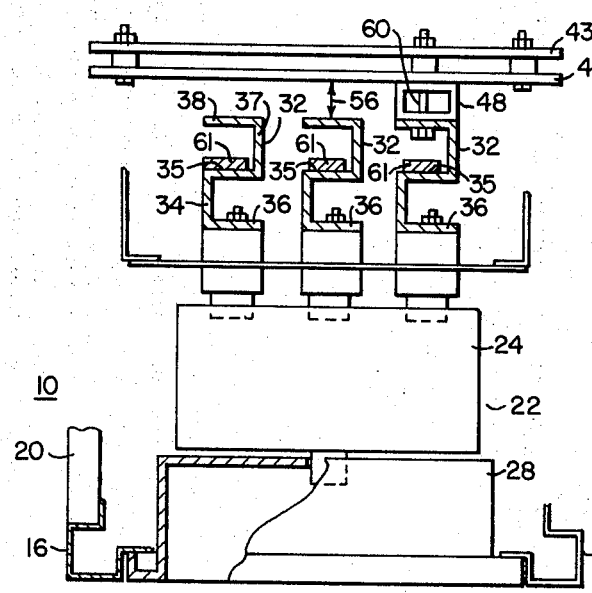
FIG. 5 is a section view of the switchgear section shown in FIG. 4 along the line V—V.

Each switchgear section 12 comprises three S-shaped vertical section bus members 32 as shown in FIGS. 2 and 5. The S-shaped section bus 32 comprises a flat front surface 36, a first rearward extending conducting surface 34, extending from one end of the flat front surface 36, a middle flat conducting surface 35 extending from the opposite end of front-to-rear extending surface 34 and in general alignment with the front surface 36, a second front-to-rear extending surface 37 connected to the edge of the middle conducting surface 35 opposite the edge to which conducting surface 34 is attached, and a rear flat conducting surface 38 attached to the edge of conducting surface 37 and in a generally front-to-rear alignment with surfaces 35 and 36. The front of flat surface 36 faces the front of switchgear section 12. Each switchgear section 12 comprises three S-shaped vertical bus members 32, one for each phase of a three-phase system. Multiple holes 40 are formed in the flat surface 36 of the S-shaped bus 32 to facilitate attachment of circuit breakers or other circuit controlling devices to the S-shaped vertical bus. The multiple holes 40 are evenly spaced along the flat surface 36.

Figure 3:
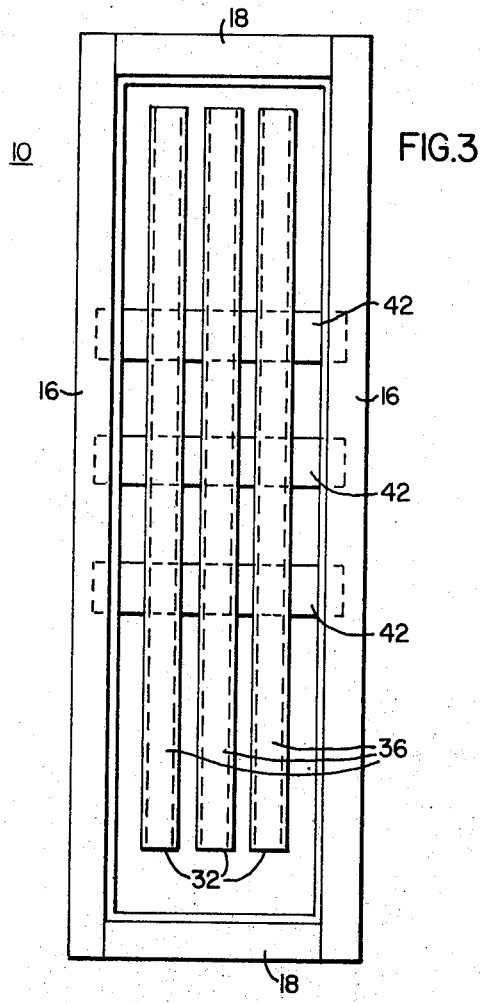
FIG. 3 is a front view of a single switchgear section.

As shown in FIGS. 3, 4 and 5, the main through bus 42 extends horizontal in the switchgear unit 10. Additional bus bars 43 can be added to each phase of the horizontal through bus 42 until the desired current rating is obtained. These additional bus bars 43 for each phase of switchgear unit 10 are added in a front-to-back spaced apart relationship. The longitudinal axis of the main through bus 42 is disposed in a generally horizontal direction while the width axis of each phase of the main through bus lies generally in a common vertical plane. Vertical spaces separate the three phases of the main through bus 42. The ends of the main through bus 42 have openings 44 formed therein to facilitate attachment to additional switchgear section 12 when desired.

The S-shaped vertical section bus 32 is located in front of the main through bus 42 with its flat surface 36 facing the front of the switchgear section 12 and the rear flat surface 38 facing the through bus 42. The three vertical section bus members 32 extend parallel in a vertical direction with the front flat surfaces 36 of the S-shaped sections 32 lying in a common vertical plane. Multiple circuit breakers 24 and other circuit controlling devices can then be easily attached to the front of the flat surface 36. The flat surface 36 is made wide enough so that good contact with adequate contact area and acceptable temperature rise can be made between the largest circuit breaker 24 to be used and the vertical S-shaped section bus 32.

The S-shaped vertical section bus 32 must be connected to the horizontal through bus 42. It is desirable that the S-shaped vertical section 32 be kept close to the horizontal through bus 42 so as to reduce the length of the load side extensions 46 projecting from circuit breakers 24. As shown in FIGS. 4 and 5, circuit breakers 24 are electrically connected to the front flat surface 36 of the S-shaped bus 32. Load side extensions 46 extend from the load terminals on the circuit breakers 24 between the vertical section bus 32 to a point at the rear of the switchgear section 12 where load cables can easily be attached. A compact S-shaped section bus 32 and horizontal through bus 42 assembly permits shorter load side extensions to be used, with resulting savings in conductor costs. The S-shaped section 32 lends itself to a simple and inexpensive connection to the main through bus 42. A rectangular tubular conductor 48 can be used for making a bolted connection between the S-shaped vertical and the main horizontal through bus 42. As best shown in FIGS. 2 and 5, the rectangular tubular connector 48 can be positioned, with its longitudinal axis running in a generally vertical direction, between the main horizontal through bus and the S-shaped vertical section bus where a connection is desired. The flat rearward facing surface 38 of the S-shaped conductor 32 provides a surface to which a bolted connection can easily be made. The maximum length of the rectangular tubular connector 48 is determined by the width of the bus bars used for the vertical through bus 42. As shown in FIG. 2, connector 48 can be as long as the main through bus 42 is wide. As shown in FIG. 5, a minimum spacing indicated by arrow 56 is required between the rear flat surface 38 of the S-shaped vertical section bus 32 and the horitonztal through bus 42 of another phase. This minimum spacing 56 determines the depth of tubular connector 48. As shown in FIG. 5, bolts 60 passing through rear surface 38 to connector 48 and the horizontal through bus 42 can be used to make a connection between vertical section 32 and through bus 42. The flat easily accessible rear facing surface 38 facilitates assembly and maintenance of the switchgear unit 10.

The S-shaped section bus 32 provides more surface area than the rectangular bar of the same cross-sectional area and size limitations. This increases current capacity and provides for good heat dissipation. The S-shaped cross-sectional vertical section 32 also has a relatively high section modulus which provides good strength and helps prevent deformation under high short circuit conditions. The middle surface 35 of the S-shaped conductor 32 provides as easily accessible area to which rectangular bars vertically disposed can be attached to increase the current rating of the vertical section bus 32. As shown on FIG. 5 a rectangular bus bar 61 can be added to surface 35, when desired, to increase the continuous current ampacity of the vertical section bus 32. The rectangular vertically disposed bus bar 61 can be attached to the S-shaped vertical section bus 32 by suitable means such as welding or bolting. The S-shaped vertical section bus and the rectangular tubular connector 48 provide a simple, inexpensive connection means to the main through bus 42. This construction also provides a compact bus bar arrangement. The S-shaped vertical section bus 32 can withstand high short circuit currents without damage and provides an easily accessible flat surface 35 to which additional conductors can be attached for increased rating.

I claim:

1. A metal-enclosed switchgear unit, comprising:
    a generally rectangular section structure;
    three horizontally extending main through bus bar conductors disposed horizontally in a spaced apart relationship in said rectangular section;
    three vertical risers disposed in said rectangular section in front of said main horizontal through bus;
    connector means electrically connecting each phase of said horizontal main through bus to its associated vertical riser; and
    each of said vertical risers comprising a front flat surface facing the front of said switchgear unit, a first rearwardly extending rectangular bus member extending rearwardly in close proximity to one end of said flat surface, a middle flat surface member in front-to-back alignment with said front flat surface extending in close proximity to the rearward edge of said first rectangular bus member, a second rearward extending rectangular bus member extending in close proximity to the edge of said middle flat surface member opposite said first rearward extending surface and extending in a generally rearward direction perpendicular to said middle flat surface, and a rear flat surface member aligned with said front flat surface and said middle flat surface facing the rear of said switchgear unit and extending in close proximity to the back edge of said second rectangular bus member.

2. A metal-enclosed switchgear unit as claimed in claim 1, wherein:
    a plurality of enclosures for housing circuit breakers are formed in the front of said rectangular section; and
    a plurality of electrical devices are supported in said enclosures and are electrically connected to said vertical risers.

3. A metal-enclosed switchgear unit as claimed in claim 1, wherein:
    said connector means comprises a rectangular tubular bus member being disposed between said horizontal through bus and said vertical section bus;
    said rectangular tubular bus member is disposed with the longitudinal axis extending in a generally vertical direction with one side engaging said horizontal through bus and the opposite side engaging said rear flat surface member of said vertical section bus; and
    fastening means is provided to force said vertical section bus and said horizontal through bus into high pressure engagement with said rectangular tubular bus member.

4. A metal-enclosed switchgear unit as claimed in claim 1 wherein said front flat surface of said vertical section bus has a plurality of evenly spaced holes formed therein facing the front of said switchgear unit.

5. A metal-enclosed switchgear unit as claimed in claim 4 wherein the length of said connector means is equal to the width of said horizontally extending main through bus bar conductors.

6. A metal-enclosed switchgear unit, comprising:
    a structural frame;
    multiple through bus conductors mounted in said structural frame;
    multiple vertical risers disposed in said structural frame and electrically connected to said multiple through bus conductors; and
    each of said vertical risers comprising a generally S-shaped conductor.

* * * * *